(12) United States Patent
Baek

(10) Patent No.: US 6,333,731 B1
(45) Date of Patent: Dec. 25, 2001

(54) APPARATUS FOR SIMULTANEOUSLY DISPLAYING TV AND PC IMAGES

(75) Inventor: Kwan-Seung Baek, Kyungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/948,355

(22) Filed: Oct. 10, 1997

(30) Foreign Application Priority Data

Oct. 11, 1996 (KR) .................................................. 96-45230

(51) Int. Cl.[7] .......................................................... G09G 5/00
(52) U.S. Cl. ........................... 345/115; 345/118; 348/563; 348/564; 348/565
(58) Field of Search ..................................... 345/327, 1–3, 345/118, 112, 115; 348/563, 564, 565

(56) References Cited

U.S. PATENT DOCUMENTS

| | | | |
|---|---|---|---|
| 4,631,588 | * 12/1986 | Barnes et al. | 358/149 |
| 5,249,164 | * 9/1993 | Koz | 358/21 R |
| 5,283,561 | * 2/1994 | Lumelsky et al. | 345/327 |
| 5,517,612 | * 5/1996 | Dwin et al. | 395/166 |
| 5,557,338 | * 9/1996 | Maze et al. | 348/565 |
| 5,594,467 | * 1/1997 | Marlton et al. | 345/115 |
| 5,815,216 | * 9/1998 | Sue | 348/588 |
| 5,852,437 | * 12/1998 | Wugofski et al. | 345/327 |

FOREIGN PATENT DOCUMENTS 2240898A   8/1991   (GB) .

* cited by examiner

Primary Examiner—Vijay Shankar
Assistant Examiner—Mansour M. Said

(57) ABSTRACT

An apparatus for simultaneously displaying TV and PC images capable of displaying a single image selected between PC and decoded TV images in a picture tube, or alternately displaying the PC and decoded TV images for a cycle of a horizontal synchronous signal, thereby displaying the TV image and the PC image of a high resolution as a double screen.

14 Claims, 4 Drawing Sheets

FIG.5

| MODE | SELECTION MODE | | SW1 | SW2 | SW3 |
|---|---|---|---|---|---|
| 1 | TV | | P2 | P3 | P6 |
| 2 | PC | | P1 | P3 | P5 |
| 3 | DOUBLE SCREEN (TV, TV) | | | P4 | P6 |
| 4 | DOUBLE SCREEN (PC, TV) | FORMER HALF CYCLE (PC) | P1 | P3 | P6 |
| | | LATTER HALF CYCLE (TV) | | P4 | |

APPARATUS FOR SIMULTANEOUSLY DISPLAYING TV AND PC IMAGES

BACKGROUND OF THE INVENTION

1. Field of the Invention

The present invention relates to processing a image signal of a TV, and in particular to an improved apparatus for simultaneously displaying TV and PC (personal computer) images on a TV display by dividing the TV and PC images.

2. Description of the Conventional Art

FIG. 1 is a circuit diagram of a TV system having a conventional double screen display function. As shown therein, the circuit includes a microcomputer 106 for outputting a first control signal cs and a second control signal dw in order to display a double screen according to a viewer's selection; an audio/video switch 101 for outputting a single signal among a main image signal Vim which passes through a main tuner and an intermediate frequency processing unit (not illustrated) in accordance with the first control signal cs, a sub image signal Vis which passes through a sub tuner and the intermediate frequency processing unit, and an external input signal Vex; a first comb filter 102 for separating the main image signal Vim which is outputted from the audio/video switch 101 into a main luminance signal Ym and a main chrominance signal Cm by using a subcarrier frequency $f_{sc}$ of 3.58 MHz and applying the two signals to the audio/video switch 101; a second comb filter 103 for separating the sub image signal Vis or the external input signal Vex which is received from the audio/video switch 101 into a sub luminance signal Ys and a sub chrominance signal Cs and then outputting the two signals; a double screen control unit 104 for receiving the main luminance signal Ym and the main chrominance signal Cm which are received from the audio/video switch 101 and the sub luminance signal Ys and the sub chrominance signal Cs which are received from the second comb filter 103, and for outputting a double screen luminance signal Ydw and a double screen chrominance signal Cdw; a double screen switch 105 for outputting the main luminance signal Ym and the main chrominance signal Cm which are received from the audio/video switch 101 in accordance with the second control signal dw of the microcomputer 106 or outputting the double screen luminance signal Ydw and the double screen chrominance signal Cdw which are received from the double screen control unit 104; a video chroma signal processing unit 107 for converting the luminance signal Y and the chrominance signal C which are received from the double screen switch 105 to primary color signals R, G, B, and amplifying and outputting the primary color signals; and a RGB amplifier 108 for converting the amplified R, G, B signals to a magnitude which is needed for driving a picture tube 109.

Here, the external input signal Vex is a signal which is inputted to an external input terminal (not illustrated) of the TV, such as a video image signal.

The operation of the conventional TV system will now be described in detail.

When the main image signal Vim which passed through the main screen tuner and the intermediate frequency processing unit (not illustrated), the sub image signal Vis which passes through the sub screen tuner and the intermediate frequency processing unit, and the external input signal Vex are inputted to the audio/video switch 101, the audio/video switch 101 sends the main image signal Vim to the first comb filter 102 through a first output terminal Vout1.

On the other hand, a viewer who decides to watch a picture (an image) according to the sub image signal Vis or the external input signal Vex controls the microcomputer 106, and the sub image signal Vis or the external input signal Vex is inputted to the second comb filter 103 through a second output terminal Vout2 in accordance with a logical state of the first control signal cs, which is changed by to the control of the viewer. The first comb filter 102 separates the main image signal Vim into the main luminance signal Ym and the main chrominance signal Cm by using the subcarrier frequency $f_{sc}$ of 3.58 MHz, and the main luminance signal Ym and the main chrominance signal Cm pass through the audio/video switch 101, and then are inputted to the double screen control unit 104 and double screen switch 105.

The second comb filter 103 separates the sub image signal Vis or the external input signal Vex received from the second output terminal Vout2 into the sub luminance signal Ys and the sub chrominance signal Cs and sends the two signals to the double screen control unit 104.

The double screen control unit 104 converts each inputted signals Ym, Cm, Ys, and Cs into a digital signal, reads and writes each signal in a memory, and again converts the digital signal to an analog signal. The double screen control unit 104 generates the double screen luminance signal Ydw and double screen chrominance signal Cdw by having a different read and write timing of each memory, and sends the two signals to the double screen switch 105, thereby performing a double window or PIP. Here an applied frequency band is approximately 2 MHz.

The viewer decides whether to watch a single or double screen and controls the microcomputer 106, and accordingly a logical state of the second control signal dw of the microcomputer 106 is changed, and the double screen switch 105 selects each signal from the above signals Ym, Cm, Ydw, and Cdw in accordance with the logical state of the second control signal dw and outputs the selected signals to the video chroma signal process unit 107. The inputted signals Y and C are converted to the primary color signals R, G, B by an inner matrix in the video chroma signal process unit 107 and amplified up to the magnitude for which the RGB amplifier 108 needs to drive the picture tube 109, and applied to each RGB cathode of the picture tube 109, whereby a single screen appears according to the main image signal, or a double screen appears according to the main and sub image signals, or the main image and external input signals.

Therefore, the viewer can watch the single or double screen by controlling the microcomputer 106.

In addition, the viewer also can watch a double screen processed in a personal computer PC by using the conventional art as described above. In this case, when the viewer connects the output terminal for outputting a image signal of the PC to an external input terminal, the image signal processed in the PC is inputted to the audio/video switch 101 through the external input terminal. That is, the external input signal Vex of the audio/video switch 101 becomes a PC image signal.

Also, when the viewer controls the microcomputer 106, the double screen switch 105 transits the double screen luminance signal Ydw and the double screen chrominance signal Cdw outputted from the double screen control unit 104, thus the double screen according to the main image signal and the PC image signal can be displayed. Accordingly, the viewer is able to watch the TV and PC image simultaneously.

The frequency band of the TV image signal is approximately 2 to 3 MHz, and the frequency band of the PC image signal with a high resolution is approximately 20 MHz in a VGA mode. Namely, a horizontal frequency of the PC image signal is about 31.5 kHz, twice as much as a TV horizontal frequency, and if the number of horizontal dot is 640, the frequency band is 31.5 KHz*640, that is, about 20 MHz.

In order to display the PC image of a high resolution, a TV system should be able to process the frequency band of 20 MHz. However, in the conventional art, when the PC image signal is inputted to the audio/video switch 101, the PC image signal passes through the double screen control unit 104, here the frequency band of about 2 MHz is applied for the double screen control unit 104, thus the resolution of the PC image is considerably dropped because it needs the frequency band about 20 MHz.

SUMMARY OF THE INVENTION

Accordingly, it is an object of the present invention to provide an apparatus for simultaneously displaying a TV image and PC image which has a higher resolution than the TV image.

It is another object of the present invention to provide an apparatus for simultaneously displaying the TV and PC images capable of simultaneously displaying the PC at a high resolution, and the TV image by processing a PC image signal separately without passing a double screen control unit which has a narrow frequency band.

To achieve the above objects, there is provided an apparatus simultaneously displaying the TV and PC images, comprising a double screen control unit for receiving a main image signal and a sub image signal which are decoded, and for outputting double screen image signals, a PC signal process unit for decoding a PC chrominance signal and generating synchronous signals in accordance with PC synchronous signals when displaying a double screen, a switch control unit for outputting a selection signal which selects a main or sub image from a double screen image outputted from the double screen control unit, a switch unit for selecting and outputting a single synchronous signal between two synchronous signals which are inputted in accordance with each switching signal of the switch control unit and a microcomputer, and selecting and outputting a single image signal among the PC image signal, the main screen image signal, and the double screen image signal, and a first matrix unit for outputting color signals by decoding the image signal outputted from the switch unit.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a table showing each connection state of switches SW1, SW2, and SW3 of a RGB interface in accordance with each image mode.

DETAILED DESCRIPTION OF THE INVENTION

Figure 1:
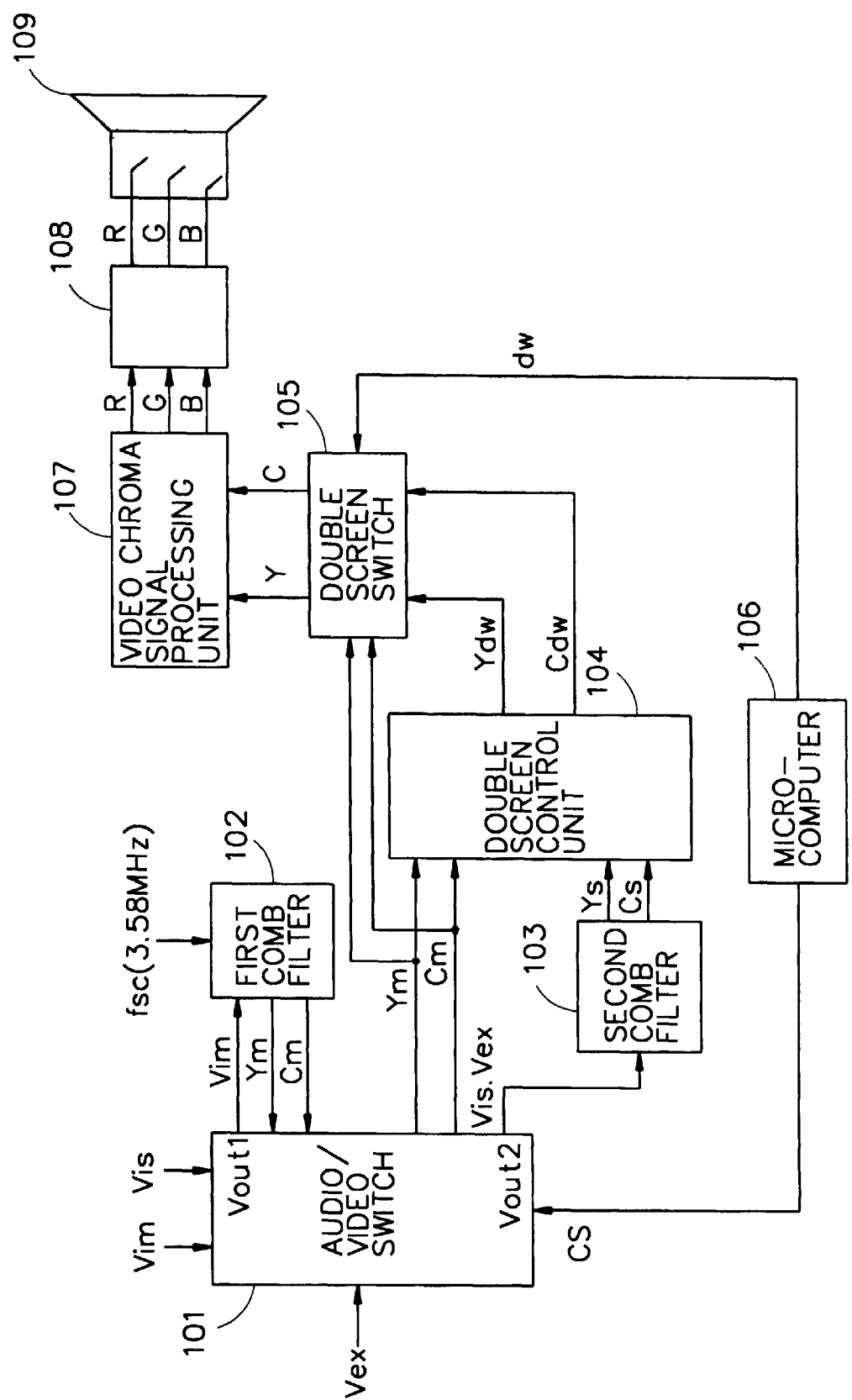
FIG. 1 is a diagram illustrating a conventional TV system capable of displaying a double screen.
Figure 2:
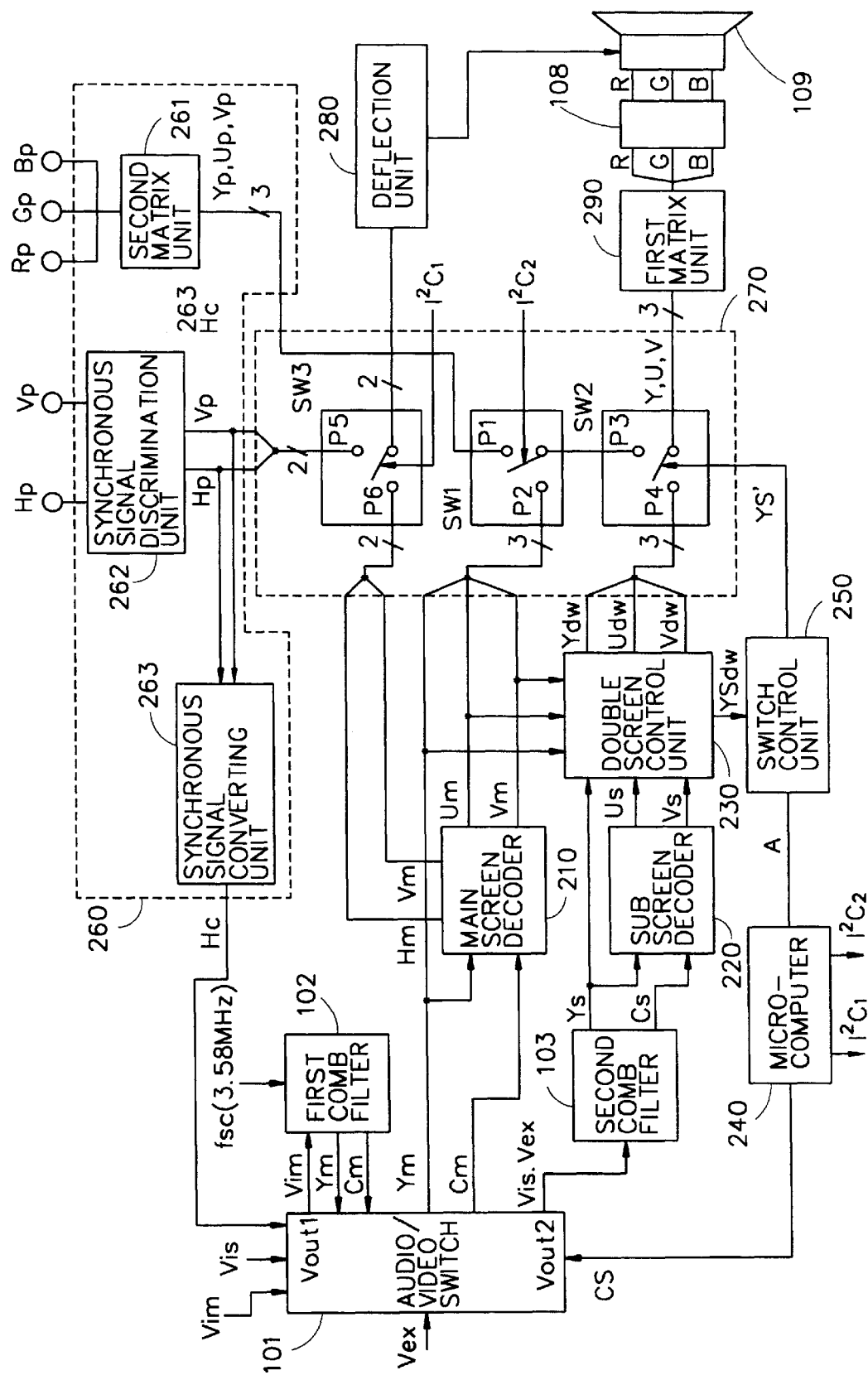
FIG. 2 is a diagram illustrating an apparatus for simultaneously displaying TV and PC images according to the present invention.

FIG. 2 is a diagram illustrating an apparatus for simultaneously displaying TV and PC images according to the present invention, here an audio/video switch 101, a first comb filter 102, a second comb filter 103, a RGB amplifier 108, and an picture tube 109 are identical in construction as described in the conventional art.

A main screen decoder 210 receives a main luminance signal Ym and a main chrominance signal Cm from the audio/video switch 101, thereby outputting main chrominance decoding signals R−Ym=Um and B−Ym=Vm which are separated from the inputted signals Ym and Cm as well as a main horizontal synchronous signal Hm and a main vertical synchronous signal Vm.

A sub screen decoder 220 receives a sub luminance signal Ys and a sub chrominance signal Ys from the second comb filter 103 and outputs sub chrominance signals R−Ys=Us and B−Ys=Vs.

A double screen control unit 230 receives the decoded signals Um, Vm, Us, and Vs and the luminance signals Ym and Ys, and outputs a double screen luminance signal Ydw and double screen chrominance decoding signals Udw and Vdw for displaying a double screen, and outputs a double screen selection signal YSdw for switching.

A microcomputer 240 outputs a first control signal cs, a second control signal A, a first switching signal $IC^21$, and a second switching signal $IC^22$ of which each logical state is changed by a viewer's selection.

A switch control unit 250 receives the double screen selection signal YSdw outputted from the double screen control unit 230 and outputs a third switching signal YS' in accordance with the second control signal A.

A PC signal process unit 260 generates synchronous signals when displaying a double screen in accordance with PC synchronous signals Hp and Vp and outputs PC decoding signals Yp, Up, and Vp by decoding PC color signals Rp, Gp, and Bp.

A switch unit 270 outputs synchronous signals each selected between the main screen synchronous signals Hm and Vm outputted from the main screen decoder 210 and the PC synchronous signals Hp and Vp outputted from the PC signal process unit 260, and outputs decoding signals each selected among the main chrominance decoding signals Um and Vm, the double screen chrominance decoding signals Udw and Vdw, and the PC decoding signals Yp, Up, and Vp.

Numeral 280 is a deflection unit, and 290 is a first matrix unit for converting the decoding signals to color signals R, G, B and outputting the converted signals to the RGB amplifier 108. The PC signal process unit 260 includes: a second matrix unit 261 for outputting PC decoding signals Yp, Up, and Vp by decoding the color signals Rp, Gp, and Bp; a synchronous signal discrimination unit 262 for synchronizing polarity of the inputted synchronous signals Hp and Vp with that of the main screen synchronous signals Hm and Vm (that is, the synchronous signal discrimination unit synchronizes polarity of the synchronous signals which are changed in accordance with a graphic mode and text mode selection of the PC with polarity of the main screen synchronous signal); and, a synchronous signal converting unit 263 for receiving the PC synchronous signals Hp and Vp outputted from the synchronous signal discrimination unit 262 and outputting a synthetic synchronous signal Hc, used as a synchronous signal when displaying the double screen, to the audio/video switch 101, thereby generating a double screen synchronous signal.

The switch unit 270 includes: a first switch SW1 for selecting the main chrominance decoding signals Um and Vm or the PC decoding signals Yp, Up, and Vp by the second switching signal $I^2C2$ of the microcomputer 240; a second switch SW2 for outputting a signal selected in the first switch SW1 or the double screen chrominance decoding signals Udw and Vdw in accordance with the third switching signal YS' of the switch control unit 250; and, a third switch SW3 for outputting the main screen synchronous signals Hm and Vm or the PC synchronous signals Hp and Vp to the deflection unit 280 in accordance with the first switching signal $I^2C1$ of the microcomputer 240.

Figure 3:
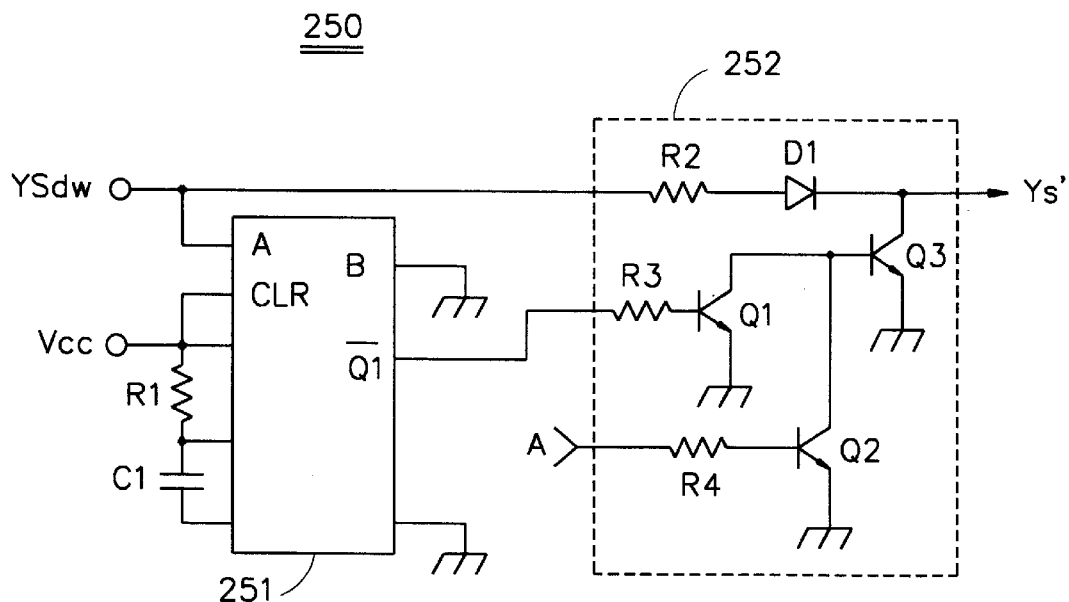
FIG. 3 is a block diagram illustrating a switch control unit in FIG. 2.

FIG. 3 is a circuit diagram of the switch control unit 250. As shown therein, the switch control unit 250 includes a multivibrator 251 for outputting a signal /Q1 to a converting terminal /Q1 in accordance with a time constant determined by a resistance R1 and a capacitor C1 when receiving the double screen selection signal YSdw, and a selection signal control unit 252 for converting said output signal /Q1 from the multivibrator 251 by the second control signal A of the microcomputer 240 (the selection signal control unit 252 transits or cuts off the double screen selection signal YSdw of the double screen control unit 230 by the second control signal A of the microcomputer 240). The selection signal control unit 252 includes: a first switching transistor Q1 controlled by the output signal /Q1 of the multivibrator 251; a second switching transistor Q2 controlled by the second control signal A of the microcomputer 240; and, a third switching transistor Q3 operating in accordance with a turn-on or turn-off state of the first and second switching transistors Q1 and Q2. Here, numerals R2, R3, and R4 are current limiting resistances, and D1 is a diode.

The operations of the embodiment of the apparatus for simultaneously displaying TV and PC images according to the present invention will now be described in detail.

The operation of the audio/video switch 101, the first comb filter 102, and the second comb filter 103 in accordance with a main image signal Vim inputted after passing through a main screen tuner and an intermediate frequency process unit (not illustrated), a sub image signal Vis inputted after passing through a sub screen tuner and the intermediate frequency process unit, and the external input signal Vex are same as the conventional art.

The main screen decoder 210 receives the main luminance signal Ym and the main chrominance signal Cm from the audio/video switch 101 and outputs the main chrominance signals R−Ym=Um and B−Ym=Vm (which are separated therefrom), and outputs the main horizontal synchronous signal Hm and the main vertical synchronous signal Vm. The main chrominance decoding signals Um and Vm are inputted to a terminal p2 of the first switch SW1 of the switch unit 270, and the main screen synchronous signals Hm and Vm are inputted to a terminal p6 of the third switch SW3 of the switch unit 270.

The sub screen decoder 220 receives the sub luminance signal Ys and the sub chrominance signal Cs and outputs the sub chrominance decoding signals R−Ys=Us and B−Ys=Vs.

Figure 4:
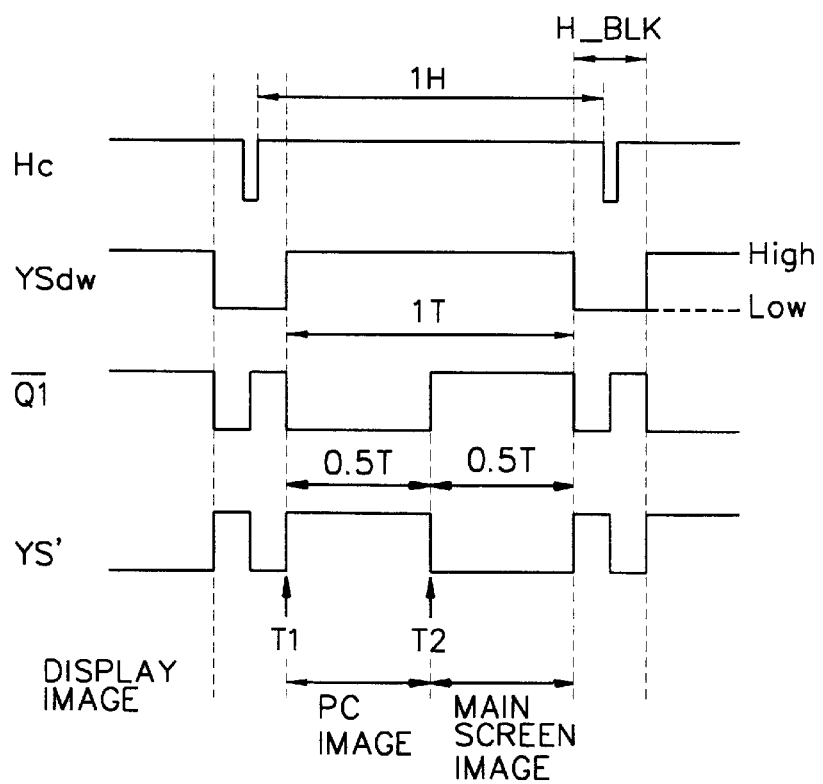
FIG. 4 is a timing diagram illustrating each signals when simultaneously displaying the PC and TV images.

The double screen control unit 230 which receives the main luminance signal Ym, the main chrominance decoding signals Um and Vm, the sub luminance signal Ys, and the sub chrominance decoding signals Us and Vs, converts the inputted signals to each digital signals and again converts the digital signal to an analog signal after writing and reading each signal in an inner memory, and then outputs the double screen luminance signal Ydw and double screen chrominance decoding signals Udw and Vdw, which are generated by which the signals (Ym, Um, Vm, Ys, Us, and Vs) have different memory write and read timings, to another terminal p4 of the second switch SW2 of the switch unit 270, and also outputs the double screen selection control signal YSdw to the switch control unit 250. The double screen selection signal YSdw is outputted at a high level while the double screen image signals Ydw, Udw, and Vdw are being outputted. However, as shown in FIG. 4, the double screen selection signal YSdw is outputted at a low level while a horizontal blanking signal H_BLK is being outputted, except the double screen image signal interval, thereby becoming a criterion for selecting the double screen.

The PC color signals Rp, Gp, and Bp inputted to the PC signal process unit 260 are decoded to the PC decoding signals Yp, Up, and Vp in the second matrix unit 261 and inputted to a terminal P1 of the first switch SW1.

The polarity of each of the PC synchronous signals Hp and Vp inputted to the PC signal process unit 260 varies in accordance with graphic and text modes of the PC, and the synchronous signal discrimination unit 262 uniformly outputs a polarity of the PC synchronous signals Hp and Vp in order to have the same polarity as the main screen synchronous signals Hm and Vm which are inputted to the terminal p6 of the third switch SW3. Here, the frequency of the PC horizontal synchronous signal Hp is about 31.5 kHz in the graphic mode of a high resolution.

The PC synchronous signals Hp and Vp outputted from the synchronous signal discrimination unit 262 are inputted to the synchronous signal converting unit 263 and converted into a synthetic synchronous signal Hc, and said synthetic synchronous signal Hc is inputted to the audio/video switch 201, and used as a synchronous signal when displaying the double screen for the PC and TV images.

Here, when the viewer operates the microcomputer 106, each logical state of the second control signal A and the first and second switching signals $I^2C1$ and $I^2C2$ outputted from the microcomputer 106 are changed.

The switch control unit 250 outputs the third switching signal YS' which has a different logical state in accordance with the logical state of the control signal A and the double screen selection signal YSdw, and a connection state of the second switch SW2 is determined by the third switching signal YS'.

Also, a connection state of the first switch SW1 and the third switch SW3 is determined by the second switching signal $I^2C2$ and the first switching signal $I^2C1$, respectively.

As described above, the plurality of modes are established in accordance with the logical state of the signals A, $I^2C1$, and $I^2C2$ outputted from the microcomputer 240, and the viewer selects a corresponding mode, thus, as shown in FIG. 5, a TV image (mode 1), a PC image (mode 2), a double screen image having main and sub images of the TV (mode 3), or a double screen image having a PC image and the main screen of the TV (mode 4) is displayed on a TV display.

Next, the operation of the switch unit 270 according to each mode will now be described.

In mode 1, namely, when only the TV image is displayed, the terminal p6 of the third switch SW3 is selected by the first switching signal $I^2C1$, and the main screen synchronous signals Hm and Vm are inputted to the deflection unit 280. Also, the terminal p2 of the first switch SW1 is selected by the second switching signal $I^2C2$, and the terminal p3 of the second switch SW2 is selected by the third switch signal YS' of the switch control unit 250, thus the main luminance signal Hm and the main chrominance decoding signals Um and Vm are applied to the first matrix unit 290.

The first matrix unit 290 converts the signals Hm, Um, and Vm to the color signals R, G, and B, and outputs the color signals to the RGB amplifier 108. A TV image signal is displayed on the TV set after passing through the picture tube 109 in accordance with a deflection current of the deflection unit 280.

In mode 2, when the PC image is only displayed, the terminal p5 of the third switch SW3 is selected and the PC synchronous signals Hp and Vp are inputted to the deflection unit 280, and the terminals p1 and p3 of the first and second switches SW1 and SW 2 are selected, thus the PC decoding signals Yp, Up, and Vp are inputted to the first matrix 290.

In mode 3, when the double screen image having the main and sub screen of the TV is displayed, the terminal p6 of the third switch SW3 is selected and the main screen synchronous signals Hm and Vm are inputted to the deflection unit 280, and the terminal p4 of the second switch SW2 is selected, thus the double screen decoding signals Ydw, Udw, and Vdw outputted from the double screen control unit 230 are inputted to the first matrix unit 290.

In mode 4, when the double screen image having the PC image and the main screen of the TV is displayed, the terminal p6 of the third switch SW3 and the main screen synchronous signals Hm and Vm are inputted to the deflection unit 280, here the main screen horizontal synchronous signal Hm means the synthetic synchronous signal Hc of the synchronous signal converting unit 263 which is outputted after passing through the audio/video switch 101 and the main screen decoder 210, and hereinafter the synchronous signal used in mode 4 is the synthetic synchronous signal Hc. Also, the terminal p1 of the first switch SW1 is selected, here the second switch SW2 selects the terminal p3 for the first half cycle of a cycle of the synthetic synchronous signal Hc and selects the terminal p4 for the latter half cycle thereof. Accordingly, the PC image which is selected by the terminal p3 of the second switch SW2 is displayed on a one half screen of the TV, and the TV image selected by the terminal p4 of the second switch SW2 is displayed in the other half of the screen thereof. With reference to FIGS. 3 and 4, the operation of the switch control unit 250 with respect to mode 4 will now be described.

In mode 4, the second control signal A of the microcomputer 240 always maintains a low level.

The double screen selection signal YSdw of the double screen control unit 230 is at a low level in a horizontal blanking interval H_BLK of the synthetic synchronous signal Hc, and at a high level in the rest interval thereof.

When the double screen selection signal YSdw which is inputted to the switch control unit 250 becomes a high level at a point of time T1 where the horizontal blanking interval H_BLK is finished, the output signal /Q1 of the multivibrator 251 is at a low level for a predetermined time in accordance with the time constant determined by the resistance R1 and capacitor C1, and is changed to a high level from a point of time T2.

Also, the selection signal control unit 252 converts and outputs the above output signal /Q1. That is, if the output signal /Q1 is at a low level, the double screen selection signal YSdw is outputted as the third switching signal YS' after passing through the resistance R3 and diode D1, however, when the output signal /Q1 is a high level, a level of the third switching signal YS' becomes a ground level. The selection signal control unit 252 includes three switching transistors, as shown in FIG. 3, and may include other switching means.

As shown in FIG. 4, if the third switching signal YS' maintains a high level for a first half cycle T1–T2 and the terminal p3 of the second switch SW2 is selected, a PC image is displayed on the left side of the TV display, and a TV image is displayed on the right side thereof.

Also, As described above, a frequency band of the TV image mentioned in the above embodiment according to the present invention is approximately 2–3 MHz, and if the PC image mode is a VGA mode, a frequency band of the VGA mode is approximately 20 MHz. That is, a frequency of the horizontal synchronous signal Hp of the PC image is about 31.5 kHz, twice as much as a frequency of the TV horizontal synchronous signal Hm. Here, one cycle is about 31.7 $\mu$s and the PC image is displayed for the cycle, and then the TV double screen image is displayed for the next cycle, 31.7 $\mu$s.

In other word, supposing that a cycle 1T except the horizontal blanking interval H_BLK in the synthetic synchronous signal Hc is 63.5 $\mu$s, the output signal /Q1 is at a low level for a half of the cycle 1T, 31.7 $\mu$s, and at a high level for the rest half of the cycle 1T. That is, the time constant T of the multivibrator 251 should be set up in order to be a half cycle 0.5T of the synthetic synchronous signal Hc according to the following formula.

$$T=0.7\ R_1C_1=0.5\ YS'$$

That is, the second switch SW2 is switched, so that the PC image signals Yc, Uc, and Vc are inputted to the first matrix unit 290 for the first half cycle 31.7 $\mu$s of the synthetic synchronous signal having a cycle of 63.5 $\mu$s, and the TV double screen image signals Ydw, Udw, and Vdw are inputted thereto for the latter half cycle 31.7 $\mu$s, thus the PC image is displayed on the left side of the monitor, and TV image is displayed on the right side thereof.

As described above, the TV image is outputted from the double screen control unit, while the PC image of a high resolution does not pass the double screen control unit having a narrow frequency band, thus the viewer can simultaneously watch the TV and distinct PC images on a single screen.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. In a display apparatus for displaying a double screen image, an apparatus for simultaneously displaying TV and PC (personal computer) images, comprising:

a double screen control unit to receive main TV image and sub TV image signals, and to generate a double screen image signal from the main TV image and sub TV image signals;

a PC signal process unit to generate a PC image signal and to generate a synthetic synchronous signal in accordance with PC synchronous signals;

a switch control unit to generate a selection signal which selects one of the double screen image and another image, in accordance with the synthetic synchronous signal; and a switch unit to select a single synchronous signal between the PC synchronous signals and TV synchronous signals, and to select a single image signal among the PC image signal, the main TV image signal, and the double screen image signal based on the selection signal.

2. In a display apparatus for displaying a double screen image, an apparatus for simultaneously displaying TV and PC images, comprising:

a double screen control unit to receive main TV image and sub TV image signals, and to generate a double screen image signal from the main TV image and sub TV image signals;

a PC signal process unit to generate a PC image signal and to generate a synthetic synchronous signal in accordance with PC synchronous signals;

a switch control unit to generate a selection signal which selects one of the double screen image and another image, in accordance with the synthetic synchronous signal; and a switch unit to select a single synchronous signal between the PC synchronous signals and TV synchronous signals, and to select a single image signal among the PC image signal, the main TV image signal, and the double screen image signal based on the selection signal, wherein the switch control unit comprises:

a multivibrator to receive a double screen selection signal from the double screen control unit and to output a signal which alternately has low and high levels in accordance with a time constant of the circuit; and a selection signal control unit to output the signal outputted from the multivibrator in accordance with an output signal from a converting terminal of the multivibrator and a control signal of the microcomputer.

3. The apparatus of claim 2, wherein the selection signal control unit comprises:

a first switching transistor controlled by the output signal of the multivibrator;

a second switching transistor controlled by the control signal of the microcomputer; and a third switching transistor operated in accordance with a turn-on/off state of the first and second switching transistors.

4. The apparatus of claim 2, wherein the double screen selection control signal outputted from the double screen control unit maintains a high level while the double screen image signal is being outputted, and a low level for a horizontal blanking interval.

5. The apparatus of claim 1, wherein the switch unit comprises:

a first switch for selecting a main chrominance decoding signal or a PC decoding signal in accordance with a second switching signal of the microcomputer;

a second switch for outputting a signal selected in the first switch or double screen chrominance decoding signals in accordance with a third switching signal of the switch control unit; and a third switch for outputting main synchronous signals or PC synchronous signals to a deflection unit in accordance with a first switching signal of the microcomputer.

6. The apparatus of claim 1, wherein the PC signal process unit comprises:

a second matrix unit for decoding PC color signals;

a synchronous signal discrimination unit for synchronizing polarity of the PC synchronous signals with that of the main screen synchronous signals; and a synchronous signal converting unit for receiving the PC synchronous signals outputted from the synchronous signal discrimination unit and outputting a synthetic synchronous signal, used as a synchronous signal when displaying the double screen, to an audio/video switch, thereby generating a double screen synchronous signal.

7. The apparatus of claim 6, wherein the synchronous signal discrimination unit synchronizes a polarity of the PC synchronous signals which are changed in accordance with PC graphic and text modes with polarity of the main screen synchronous signal.

8. A display apparatus for simultaneously displaying TV and PC images, comprising:

a PC signal processing unit to output a synchronous PC signal and to output a PC image signal;

a double screen control unit to output a double screen selection signal synchronized with the synchronous PC signal and to output a double screen TV image signal;

a switch control unit to generate a switching signal based on the double screen selection signal; and a switching unit to switch between the PC image signal and the double screen TV image signal in response to the switching signal.

9. The display apparatus of claim 8, wherein the double screen selection signal contains an image portion and a blanking portion, and wherein the switch control circuit changes a state of the switching signal about halfway through the image portion of the selection signal.

10. A display apparatus for selectively displaying TV and PC images, comprising:

a PC signal processing unit to output a PC image signal;

a main screen decoder to output a main screen TV image signal;

a double screen control unit to output a double screen selection signal and to output a double screen TV image signal;

a microprocessor to generate a control signal based on user input;

a switch control unit to generate a switching signal based on the double screen selection signal and the control signal; and a switching unit to output one of the PC image signal, the main screen TV image signal, the double screen TV image signal, and a combination of the double screen TV image signal and the PC image signal in response to the switching signal and the control signal.

11. The display apparatus of claim 10, wherein when a user selects a main screen TV image, the switching unit outputs the main screen TV image signal from the main screen decoder.

12. The display apparatus of claim 10, wherein when a user selects a PC image, the switching unit outputs the PC image signal from the PC signal processing unit.

13. The display apparatus of claim 10, wherein when a user selects a double screen TV image, the switching unit outputs the double screen TV image signal from the double screen control unit.

14. The display apparatus of claim 10, wherein when a user selects a double screen PC and TV image, the switching unit periodically switches between the PC image signal and the double screen TV image signal, and outputs the combination of the double screen TV image signal and the PC image signal.

* * * * *